United States Patent
Fennel et al.

(10) Patent No.: US 6,704,628 B1
(45) Date of Patent: Mar. 9, 2004

(54) METHOD FOR DETECTING ERRORS OF MICROPROCESSORS IN CONTROL DEVICES OF AN AUTOMOBILE

(75) Inventors: Helmut Fennel, Bad Soden (DE); Michael Latarnik, deceased, late of Friedrichsdorf (DE), by Eva-Maria Latarnik, Christine Latarnik, and Sylvia Latarnik legal representatives.

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/509,864

(22) PCT Filed: Oct. 1, 1998

(86) PCT No.: PCT/EP98/06254

§ 371 (c)(1),
(2), (4) Date: Nov. 20, 2001

(87) PCT Pub. No.: WO00/18613

PCT Pub. Date: Apr. 6, 2000

(30) Foreign Application Priority Data

Oct. 1, 1998 (DE) .......................................... 197 43 463

(51) Int. Cl.$^7$ .............................................. G01M 17/00
(52) U.S. Cl. ........................... 701/29; 701/43; 180/404
(58) Field of Search ............................ 701/29, 43, 102, 701/91; 180/404; 714/11, 6, 47

(56) References Cited

U.S. PATENT DOCUMENTS

| | | | |
|---|---|---|---|
| 4,590,549 A | 5/1986 | Burrage et al. .................. 700/2 |
| 4,791,569 A | 12/1988 | Suzuki ........................ 701/102 |
| 4,864,202 A | 9/1989 | Nitschke et al. ............ 318/560 |
| 5,339,782 A | 8/1994 | Golzer et al. ................ 123/399 |
| 5,436,837 A | 7/1995 | Gerstung et al. .............. 701/29 |
| 5,440,487 A | 8/1995 | Althoff et al. ................. 701/43 |
| 5,504,859 A | * 4/1996 | Gustafson et al. ............. 714/11 |
| 6,115,832 A | * 9/2000 | Zydek et al. .................. 714/47 |
| 6,173,229 B1 | * 1/2001 | Fennel et al. ................. 701/91 |

FOREIGN PATENT DOCUMENTS

| | | |
|---|---|---|
| EP | 0 322 141 | 6/1989 |
| EP | 0 575 854 | 12/1993 |
| GB | 2 255 422 | 11/1992 |

* cited by examiner

Primary Examiner—Marthe Y. Marc-Coleman
(74) Attorney, Agent, or Firm—Rader, Fishman & Grauer PLLC

(57) ABSTRACT

The present invention relates to a method of error detection of a microprocessor in a control unit of an automotive vehicle, wherein a control unit can send and receive data by way of a data bus, wherein the output of the microprocessor is monitored by a watchdog circuit, wherein the watchdog circuit compares the signals output by the microprocessor with predetermined signal patterns, and an error is detected when the signals output by the microprocessor are not concurrent with one of the predetermined signal patterns.

Further, the present invention relates to a method of error detection of microprocessors in control units of an automotive vehicle, wherein a first control unit can exchange data with at least one further control unit by way of a data bus, wherein the data necessary for performing at least part of the controlling or regulating task of the first control unit are sent from this first control unit to the at least one further control unit by way of the data bus, so that corresponding to the controlling or regulating method in the first control unit, the data to be determined and, if necessary, output by the first control unit are reproduced by the at least one further control unit, and an error is detected when the data determined in the first control unit differ from the data determined in the at least one further control unit.

Instead of the transmission by way of the data bus, sending the data necessary for performing the controlling or regulating task of the first control unit directly to the further control unit is also possible.

7 Claims, 2 Drawing Sheets

METHOD FOR DETECTING ERRORS OF MICROPROCESSORS IN CONTROL DEVICES OF AN AUTOMOBILE

TECHNICAL FIELD

The present invention relates to a method of error detection of microprocessors in control units of an automotive vehicle.

BACKGROUND OF THE INVENTION

Methods of this type have already become known to the applicant wherein a microprocessor and/or a data bus are monitored by means of a watchdog circuit. It is monitored cyclically by a watchdog circuit to determine if signal pulses appear, i.e., whether data are sent. In the absence of signal pulses, an error is detected. Further, it is known in the art to furnish control units with two microprocessors which process in parallel determined controlling or regulating tasks. A comparison of the results produced by the two microprocessors will also permit detection of an error in case of discrepancies in the results.

Compared thereto, an object of the present invention is to improve a monitoring system by rendering it possible that this monitoring system requires as few component parts as possible and, additionally, provides maximum reliable results in error detection.

According to the present invention, this object is achieved because the watchdog circuit compares the signals output by the microprocessor with predetermined signal patterns, and an error is detected when the signals output by the microprocessor are not concurrent with one of the predetermined signal patterns.

Compared to the use of a watchdog circuit in the prior art, it is favorable in this invention in that not only a check is made as to whether signals are sent at all, but that it is also checked whether the signals indicate a possible error. This is because a comparison of the prevailing to a plausibility test. Advantageously, it is possible to detect an error with signals still being sent.

Further, in the method according to the present invention, the data necessary for performing at least part of the controlling or regulating task of a control unit are sent from this first control unit by way of the data bus to the at least one further control unit. Corresponding to the controlling or regulating method in the first control unit, the data to be determined and, if necessary, output by the first control unit are reproduced by the at least one further control unit, and an error is detected when the data determined in the first control unit differ from the data determined in the at least one further control unit.

This method permits an especially adequate test for possible errors by parallel checking at least part of the processing of the first control unit. The effort needed for sending data to the at least one further control unit is limited in as far as data are not supplied to the control unit directly by the sensors. Instead, the data are relayed from the first control unit via the data bus which is already provided. Also, the number of components required in this method is minimized because it is not necessary to provide another microprocessor, which does not have other functions, for checking the function of one microprocessor. Rather, a function test can be performed by a microprocessor having its main task in the control or regulation of another quantity. It is possible to have the controlling or regulating task parallel processed on a second microprocessor in full, with the second microprocessor's main function including the control or regulation of another quantity so that this microprocessor is arranged in another control unit, or to have only safety-relevant parts of the controlling or regulating task operate in parallel for checking purposes.

In a preferred embodiment, the data necessary for performing at least part of the controlling or regulating task of the first control unit are also supplied to at least one further control unit. Corresponding to the method with respect to controlling or regulating in the first control unit, the data to be determined and, if necessary, output by the first control unit are reproduced by the at least one further control unit, and an error is detected when the data determined in the first control unit differ from the data determined in the at least one further control unit.

This method differs from the other preferred methods in that the data are directly sent to the at least one further control unit. Admittedly, this increases wiring efforts and structure but also improves the scope of performance. For example, it is also possible to find out processing errors which are due to a faulty connection between e.g. a sensor and the control unit. The cause of such a faulty connection may be a wrong wiring connection or also corroded contacting, for example. Further advantages are achieved when the defective control unit shall be deactivated and said's controlling or regulating task shall be taken over by the at least one further control unit. When the at least one further control unit receives the data from the first control unit, these data are no longer available after deactivation of the first control unit.

In a preferred embodiment, the data to be output by the first control unit are sent from the first control unit to the at least one further control unit by way of the data bus.

Checking and comparing the data is then performed in the at least one further control unit.

Also disclosed is a method for outputting the data by the first control unit and transmitting this data by way of the data bus from the at least one further control unit to the first control unit.

Checking and comparing the data is then performed in the first control unit. Preferably, the data being output are combined as check sums.

Advantageously, the quantity of data which must be transmitted by way of the data bus is reduced by producing these check sums from the data (e.g. by producing sums of digit, or the like). This is especially important in a great number of control units which perform mutual tests. The determined data are subjected to a plausibility test.

When a discrepancy in the data determined by two control units is detected, it may under certain circumstances be found out by way of a plausibility test which one of the control units has a malfunction. For example, a plausibility test may include that defined limit values are predetermined for defined quantities, and these quantities must range within these limits.

Preferably, the data to be determined by the first control unit are checked by at least two further control units. In this check, that control unit is identified as having a malfunction whose determined data differ from the determined data of the other control units, provided these determined data are concurrent.

When the data of several control units are concurrent, there is an extraordinary likelihood that the control units operate without malfunctions. In case of need, this criterion may still be linked to a plausibility test. Upon detection of an error, the control unit is deactivated. Favorably, the output of wrong control variables can thereby be avoided.

Preferably, the controlling or regulating task of the deactivated control unit is taken over by at least one further control unit. Advantageously, this maintains the function. The defective control unit may be overhauled during the next workshop service.

DETAILED DESCRIPTION OF THE PREFERRED EMBODIMENTS

Figure 1:
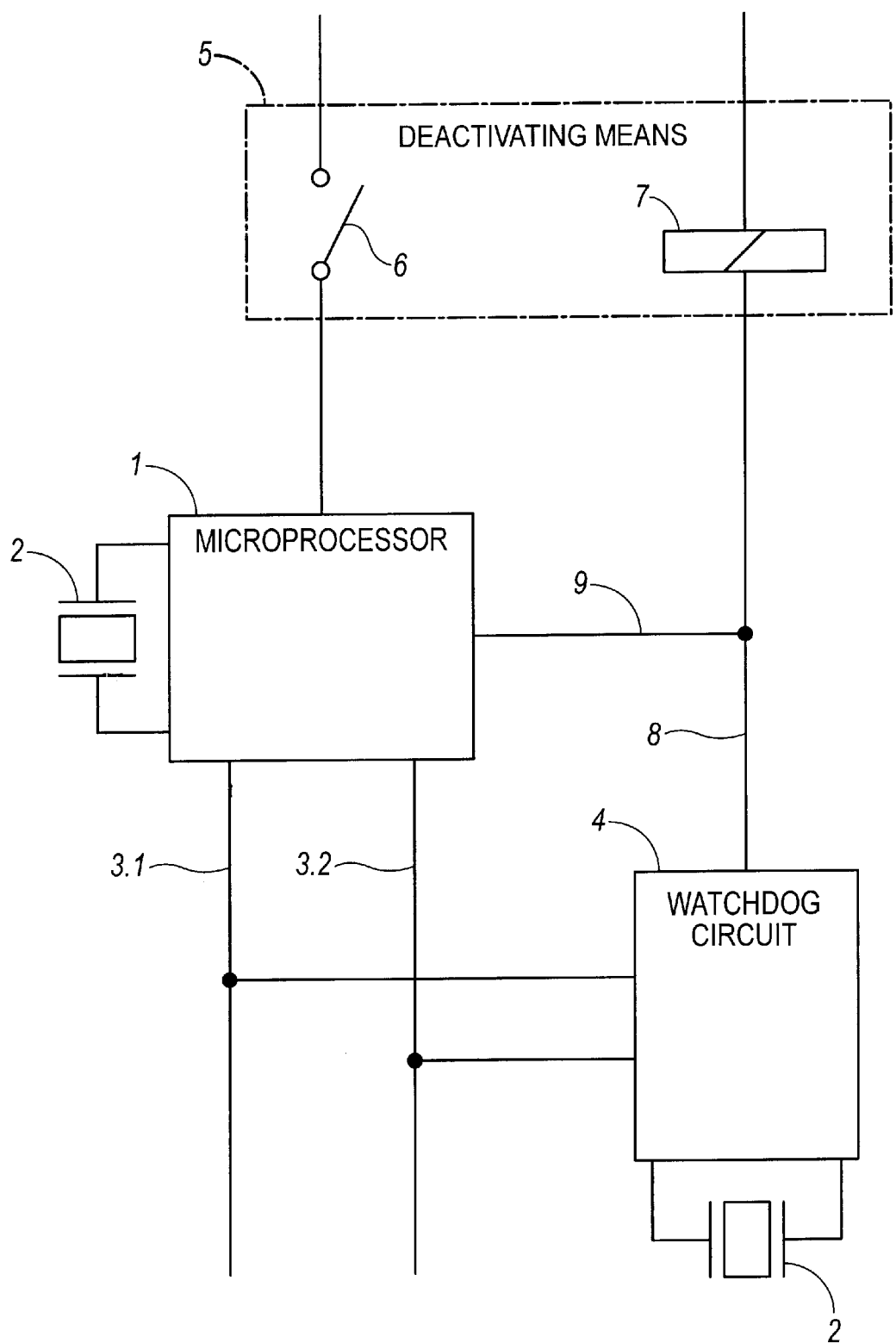
FIG. 1 an embodiment wherein a microprocessor of a control unit is monitored by way of a watchdog circuit.

In the embodiment of FIG. 1, a microprocessor 1 of a control unit is connected to a clock generator (quartz) 2. Further, the microprocessor is connected by way of lines 3.1 and 3.2 to a data bus which permits the microprocessor to exchange data with other microprocessors. These lines 3.1 and 3.2 are monitored by a watchdog circuit 4 having a clock generator 2 of its own.

According to the present invention, this watchdog circuit not only monitors the lines 3.1 and 3.2 as to whether signals are sent at all, but also monitors the data sent by the microprocessor as to whether these data correspond to defined signal patterns. The data output by the till microprocessor correspond to defined signal patterns in case these data are plausible and correct. Thus, the fact that the watchdog circuit monitors the data output by the microprocessor with respect to concurrence with the signal patterns permits detecting by way of the watchdog circuit not only a total failure of the microprocessor but also an operating condition of the microprocessor where it produces erroneous signals.

When an error is detected, the watchdog circuit 4, via a line 8, can actuate a deactivating means 5 wherein a switching element 7 opens a controllable switch 6.

As is shown in FIG. 1, the microprocessor 1 may also actuate the deactivating means 5 via line 9 and line 8, and thereby deactivate itself when the microprocessor 1 detects (e.g. due to a plausibility check) that there is an operating error.

Figure 2:
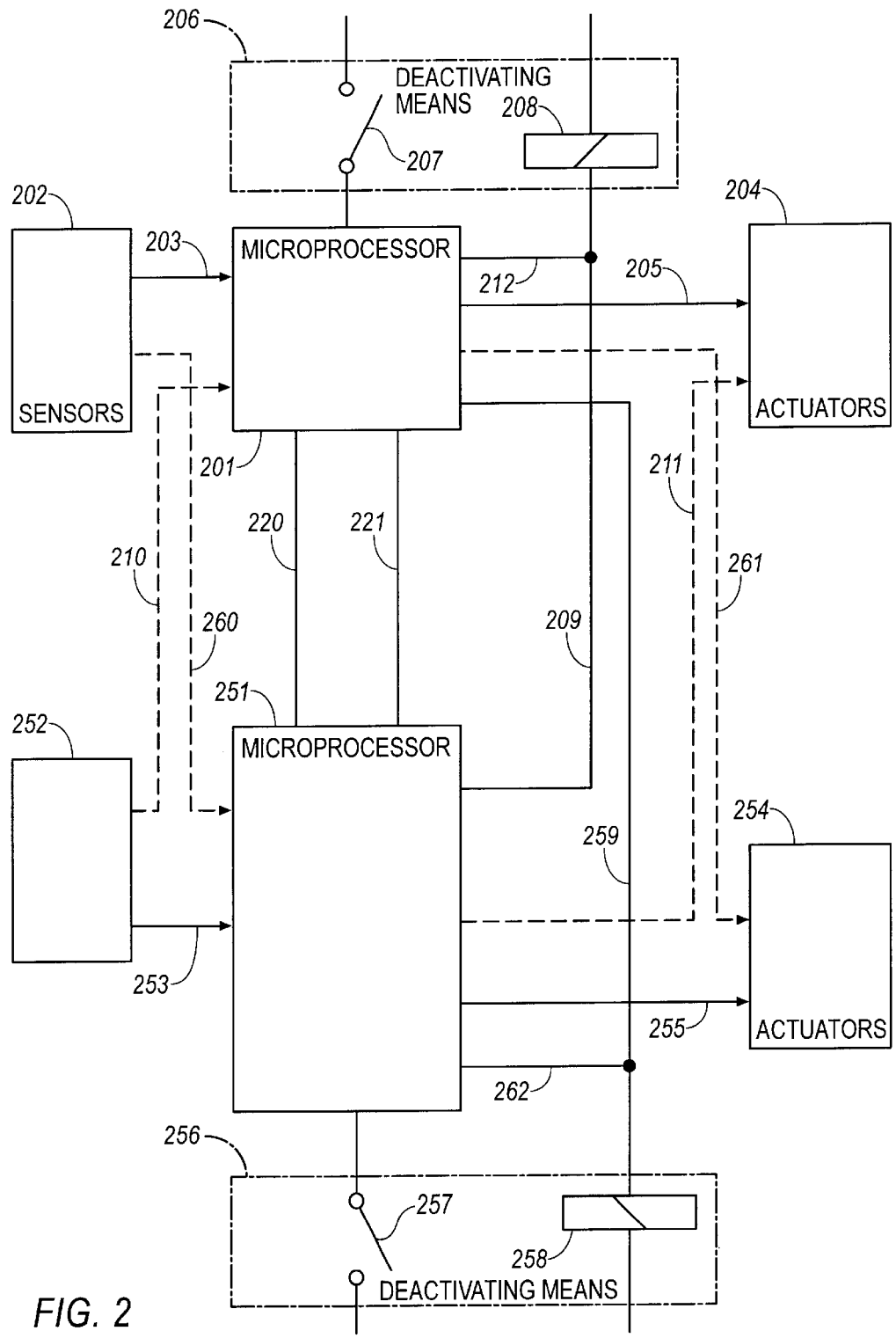
FIG. 2 an embodiment wherein two microprocessors of different control units monitor each other and themselves.

FIG. 2 shows an embodiment wherein two microprocessors 201 and 251 monitor each other and themselves. The microprocessors are accommodated in two different control units. Thus, the respective main function of the microprocessors 201 and 251 involves different controlling or regulating tasks.

For its main function, the microprocessor 201 is e.g. furnished with signals from sensors which are shown in FIG. 2 and all together have been assigned reference numeral 202. The signals of these sensors are sent to the microprocessor by way of one or more signal lines 203. In addition, the microprocessor 201 is connected to actuators which are shown in FIG. 2 and all together have been assigned reference numeral 204. The actuators 204 are driven by the microprocessor 201 by way of one or more lines 205.

The two microprocessors 201 and 251 can exchange data by way of lines 220 and 221 of a data bus.

For its main function, the microprocessor 251 is e.g. furnished with signals from sensors which are shown in FIG. 2 and all together have been assigned reference numeral 252. The signals of these sensors are sent to the microprocessor by way of one or more signal lines 253. In addition, the microprocessor 251 is connected to actuators which are shown in FIG. 2 and all together have been assigned reference numeral 254. The actuators 254 are driven by the microprocessor 251 by way of one or more lines 255.

Further, deactivating means 206 and 256 can be seen in FIG. 2 which, when driven, permit deactivation of the microprocessors 201 and 251. Each of the deactivating means 206 and 256 comprises a controllable switch 207 and 257, respectively, and a switching element 208 and 258, respectively. Advantageously, each of the deactivating means 206 and 256 can be actuated by both microprocessors 201 and 251. This actuation is effected by way of lines 207 and 209 and, respectively, lines 257 and 259. It is favorably possible that, upon detection of an error, each of the microprocessors 201 and 251 will deactivate itself, as well as that any one of the microprocessors is deactivated by the other microprocessor when this other microprocessor detects an error in the first mentioned microprocessor. To minimize the wiring needed, the deactivation may also be reduced to such an extent that each microprocessor can be deactivated by only one of the microprocessors.

With the configuration described hereinabove, one of the microprocessors 201 and 251 can send to the other microprocessor the data received from the respective sensors 202 and 252, respectively, by way of the data bus 220, 221. Corresponding to the data which then prevail, the controlling or regulating task may be processed in parallel in the other microprocessor. The result can be transmitted by way of the data bus and compared in one of the microprocessors 201 and 251, respectively. When the results differ from each other, there is an error in one of the microprocessors which can be localized possibly by way of a plausibility test or a comparison with the result of a third microprocessor (which is not shown herein for the sake of clarity). The defective microprocessor can be deactivated by actuation of the corresponding deactivating means 206 and 256, respectively. This deactivation can be performed by the corresponding microprocessor itself, or by the other microprocessor.

To minimize the quantity of data to be transmitted, the result of the controlling or regulating task can also be combined in one or more check sums for comparison purposes.

Also, the illustration of FIG. 2 still shows dotted lines 210 and 260 and 211 and 261.

The sensor data are sent by way of these lines shown directly to the microprocessor whose main object is not the processing of the controlling or regulating task of these gathered sensor data.

In a favorable mariner, this embodiment possibly permits detecting an error which is due to a wrong connection of the sensors to the respective microprocessor or, respectively, faulty contacting, e.g. due to corrosion of the connection.

It is another advantage that the controlling microprocessor is able to take over the controlling or regulating task of the checked microprocessor (which is deactivated due to detection of an error) because the data of the sensors continue to be available to this microprocessor even after deactivation of the other microprocessor. In this embodiment, the actuators of the two microprocessors 201 and 251 are drivable by the respectively other microprocessor by way of dotted lines 211 and 261 also in order to ensure that, when a microprocessor is deactivated due to a case of error, the controlling or regulating task can be taken over by the respectively other microprocessor.

What is claimed is:

1. Method of detecting errors of microprocessors used in a control units of an automotive vehicle, wherein the control units send and receive data by way of a data bus, comprising the steps of:

associating a first and second microprocessor with a first and second control unit, respectively, comparing the signals output by the first and a second microprocessor with predetermined signal patterns; and generating an error signal when the signals output by the first and second microprocessors are not concurrent with at least one of the predetermined signal patterns;

sending data to be output by the first control unit to the second control unit by way of the data bus; and combining the data being output as one or more check sums.

2. Method as claimed in claim 1, further including the step of sending the data to be output by the first control unit back into the first control unit by way of the data bus.

3. Method as claimed in claim 1, further including the step of using the second and a third control unit, for comparing the signals output by the first microprocessor and generating an error signal if the output data of the first control unit differs from the output data of the second and third control units.

4. Method as claimed in claim 1, further including the step of deactivating the erring control unit when an error is detected.

5. Method as claimed in claim 4, further including the step of reassigning the controlling or regulating task of the deactivated control unit to one of the remaining non-deactivated control units.

6. Method of error detection of a microprocessor used in a control unit of an automotive vehicle, wherein a control unit sends and receives data by way of a data bus, comprising the steps of:

comparing the signals output by the microprocessor with predetermined signal patterns;

generating an error signal when the signals output by the microprocessor are not concurrent with at least one of the predetermined signal patterns; and checking the data to be determined by the first control unit by using a second control unit and a third control unit, and generating an error signal if the output data of one of the first, second, or third control units differs from the output data of the other two control units.

7. Method of error detection of a microprocessor used in a control unit of an automotive vehicle, wherein a control unit sends and receives data by way of a data bus, comprising the steps of:

comparing the signals output by the microprocessor with predetermined signal patterns, and generating an error signal when the signals output by the microprocessor are not concurrent with at least one of the predetermined signal patterns, and sending the data to be output by the first control unit back into the first control unit by way of the data bus.

* * * * *

UNITED STATES PATENT AND TRADEMARK OFFICE
CERTIFICATE OF CORRECTION

| | | |
|---|---|---|
| PATENT NO. | : 6,704,628 B1 | Page 1 of 1 |
| APPLICATION NO. | : 09/509864 | |
| DATED | : March 9, 2004 | |
| INVENTOR(S) | : Fennel et al. | |

It is certified that error appears in the above-identified patent and that said Letters Patent is hereby corrected as shown below:

In Claim 1, column 5, line 3, please change "a control units" to --control units--.

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,704,628 B1
APPLICATION NO. : 09/509864
DATED : March 9, 2004
INVENTOR(S) : Fennel et al.

It is certified that error appears in the above-identified patent and that said Letters Patent is hereby corrected as shown below:

In Claim 1, column 5, line 3, please change "a control units" to --control units--.

Signed and Sealed this

Twenty-eighth Day of November, 2006

JON W. DUDAS
*Director of the United States Patent and Trademark Office*